US010657067B1

(12) United States Patent
Azad et al.

(10) Patent No.: US 10,657,067 B1
(45) Date of Patent: May 19, 2020

(54) MEMORY MANAGEMENT UNIT WITH PREFETCH

(71) Applicant: Xilinx, Inc., San Jose, CA (US)

(72) Inventors: Sarosh I. Azad, Fremont, CA (US); Bhaarath Kumar, Union City, CA (US)

(73) Assignee: Xilinx, Inc., San Jose, CA (US)

( * ) Notice: Subject to any disclaimer, the term of this patent is extended or adjusted under 35 U.S.C. 154(b) by 731 days.

(21) Appl. No.: 15/262,834

(22) Filed: Sep. 12, 2016

(51) Int. Cl.
*G06F 12/00* (2006.01)
*G06F 12/1027* (2016.01)
*G06F 12/0862* (2016.01)

(52) U.S. Cl.
CPC ...... *G06F 12/1027* (2013.01); *G06F 12/0862* (2013.01); *G06F 2212/6022* (2013.01); *G06F 2212/684* (2013.01)

(58) Field of Classification Search
None
See application file for complete search history.

(56) References Cited

U.S. PATENT DOCUMENTS

| | | | |
|---|---|---|---|
| 6,230,307 B1 | 5/2001 | Davis et al. | |
| 6,427,156 B1 | 7/2002 | Chapman et al. | |
| 6,522,167 B1 | 2/2003 | Ansari et al. | |
| 6,662,285 B1 | 12/2003 | Douglass et al. | |
| 6,708,191 B2 | 3/2004 | Chapman et al. | |
| 6,976,160 B1 | 12/2005 | Yin et al. | |
| 7,139,673 B1 | 11/2006 | Vashi et al. | |
| 7,219,325 B1 | 5/2007 | Lysaght | |
| 7,333,909 B1 | 2/2008 | Vashi et al. | |
| 7,370,310 B1 | 5/2008 | Saini et al. | |
| 7,401,258 B1 | 7/2008 | Fang et al. | |
| 7,454,546 B1 | 11/2008 | Lilley | |
| 7,624,209 B1 | 11/2009 | Ansari et al. | |
| 7,711,933 B1 | 5/2010 | Lysaght | |
| 7,746,099 B1 | 6/2010 | Chan et al. | |
| 7,978,802 B1 | 7/2011 | Raha et al. | |
| 7,996,649 B1 | 8/2011 | Asserhall | |
| 8,102,188 B1 | 1/2012 | Chan et al. | |
| 8,411,703 B1 | 4/2013 | Cory | |
| 8,443,230 B1 | 5/2013 | James-Roxby et al. | |
| 8,479,042 B1 | 7/2013 | James-Roxby et al. | |
| 8,769,477 B1 | 7/2014 | Gathoo et al. | |

(Continued)

OTHER PUBLICATIONS

U.S. Appl. No. 15/163,384, filed May 24, 2016, Kumar et al., Xilinx, Inc. San Jose, CA USA.

*Primary Examiner* — Midys Rojas
(74) *Attorney, Agent, or Firm* — Crawford Maunu PLLC

(57) ABSTRACT

A memory management unit circuit includes a plurality of ports with a plurality of translation buffer units. Each translation buffer unit includes a translation lookaside buffer circuit and a translation logic circuit configured to perform virtual to physical address translation using the translation lookaside buffer circuit. A translation lookaside buffer circuit prefetch logic circuit monitors virtual memory access requests received at the corresponding port of the memory management unit circuit and detects satisfaction of at least one trigger condition. In response, address translation prefetch requests are generated. A control circuit transmits the address translation prefetch requests to a physical memory circuit and receives address translation data for populating the translation lookaside buffer.

18 Claims, 5 Drawing Sheets

(56) References Cited

U.S. PATENT DOCUMENTS

| | | |
|---|---|---|
| 8,937,496 B1 | 1/2015 | Ahmad et al. |
| 9,047,474 B1 | 6/2015 | Ahmad et al. |
| 9,130,559 B1 | 9/2015 | Ahmad et al. |
| 9,130,566 B1 | 9/2015 | Ahmad et al. |
| 9,356,602 B1 | 5/2016 | Bielich et al. |
| 9,460,022 B2 * | 10/2016 | Venkatasubramanian ............... G06F 12/1027 |
| 2014/0004656 A1 | 1/2014 | Sasagawa et al. |
| 2016/0004656 A1 | 1/2016 | Arbel et al. |

\* cited by examiner

MEMORY MANAGEMENT UNIT WITH PREFETCH

TECHNICAL FIELD

The disclosure generally relates to memory prefetching, and more particularly to memory prefetching to populate a cache for virtual memory translation.

BACKGROUND

There are a variety of different applications that can use memory circuits including, but not limited to, programmable integrated circuits, programmable logic devices (PLDs), and System on Chip (SoC) devices. Some SoC devices can include programmable logic that is similar to programmable logic provided by various PLDs. PLDs are a type of programmable integrated circuit (IC) that can be programmed to perform specified logic functions. One type of PLD, the field programmable gate array (FPGA), can include an array of programmable tiles. These programmable tiles comprise various types of logic blocks, which can include, for example, input/output blocks (IOBs), configurable logic blocks (CLBs), dedicated random access memory blocks (BRAM), multipliers, digital signal processing blocks (DSPs), processors, clock managers, delay locked loops (DLLs), bus or network interfaces such as Peripheral Component Interconnect (PCI), PCI Express (PCIe) and Ethernet, and so forth. Some devices include enough components and functionality to effectively serve as an entire computer system on a single IC chip. Devices with such functionality are sometimes referred to as SoCs.

SoCs are one type of application in which multiple masters may share a common physical memory and I/O. One way in which the masters can share memory is through the use of virtual memory. Each master can operate within its own virtual address space that is mapped to the physical address space. A memory management unit (MMU) circuit can be configured to translate virtual addresses into physical addresses. The translation can be a significant bottleneck to efficiency.

These and other problems can be problematic for IC design and their uses.

SUMMARY

A number of implementations are directed toward memory prefetching to populate a cache for virtual memory translation. The prefetching can be distributed between multiple prefetch generating circuits that each correspond to a different port of an MMU circuit.

According to embodiments of the present disclosure, a system includes a memory management unit (MMU) circuit. The MMU has a plurality of ports and a plurality of translation buffer units (TBUs). Each TBU corresponds to a respective port of the plurality of ports and includes: a translation lookaside buffer (TLB) circuit; a translation logic circuit configured to perform virtual to physical address translation using the TLB circuit; and A TLB prefetch logic circuit. The TLB prefetch logic circuit is configured, for a corresponding port of the plurality of ports, to: monitor virtual memory access requests received at the corresponding port of the MMU circuit; detect, for the virtual memory access requests, satisfaction of at least one trigger condition; and generate, in response to the satisfaction of the at least one trigger condition, address translation prefetch requests. The TBU also includes a control circuit configured to transmit the address translation prefetch requests to a physical memory circuit and receive, in response to the address translation prefetch requests, address translation data for populating the TLB.

Various embodiments of the present disclosure are directed toward a method for generating address translation prefetch requests for a virtual memory and a multiple port memory management unit (MMU) circuit. The method includes: performing virtual to physical address translations using translation logic circuits, each translation logic circuit including a translation lookaside buffer (TLB) and corresponding to a respective port of the plurality of ports; monitoring, using the prefetch logic circuits corresponding to a respective port of the plurality of ports, virtual memory access requests received at ports of the MMU circuit; detecting, for the virtual memory access requests, satisfaction of at least one trigger condition; generating, in response to the satisfaction of the at least one trigger condition, address translation prefetch requests; converting the address translation prefetch to physical address requests for a page walk of a page table stored in a physical memory circuit; and receiving, in response to the address translation prefetch requests, address translation data for populating a TLB.

Other features will be recognized from consideration of the Detailed Description and Claims, which follow.

BRIEF DESCRIPTION OF THE DRAWINGS

Various aspects and features of the method, device, and system will become apparent upon review of the following detailed description and upon reference to the drawings in which.

DETAILED DESCRIPTION

Figure 1:
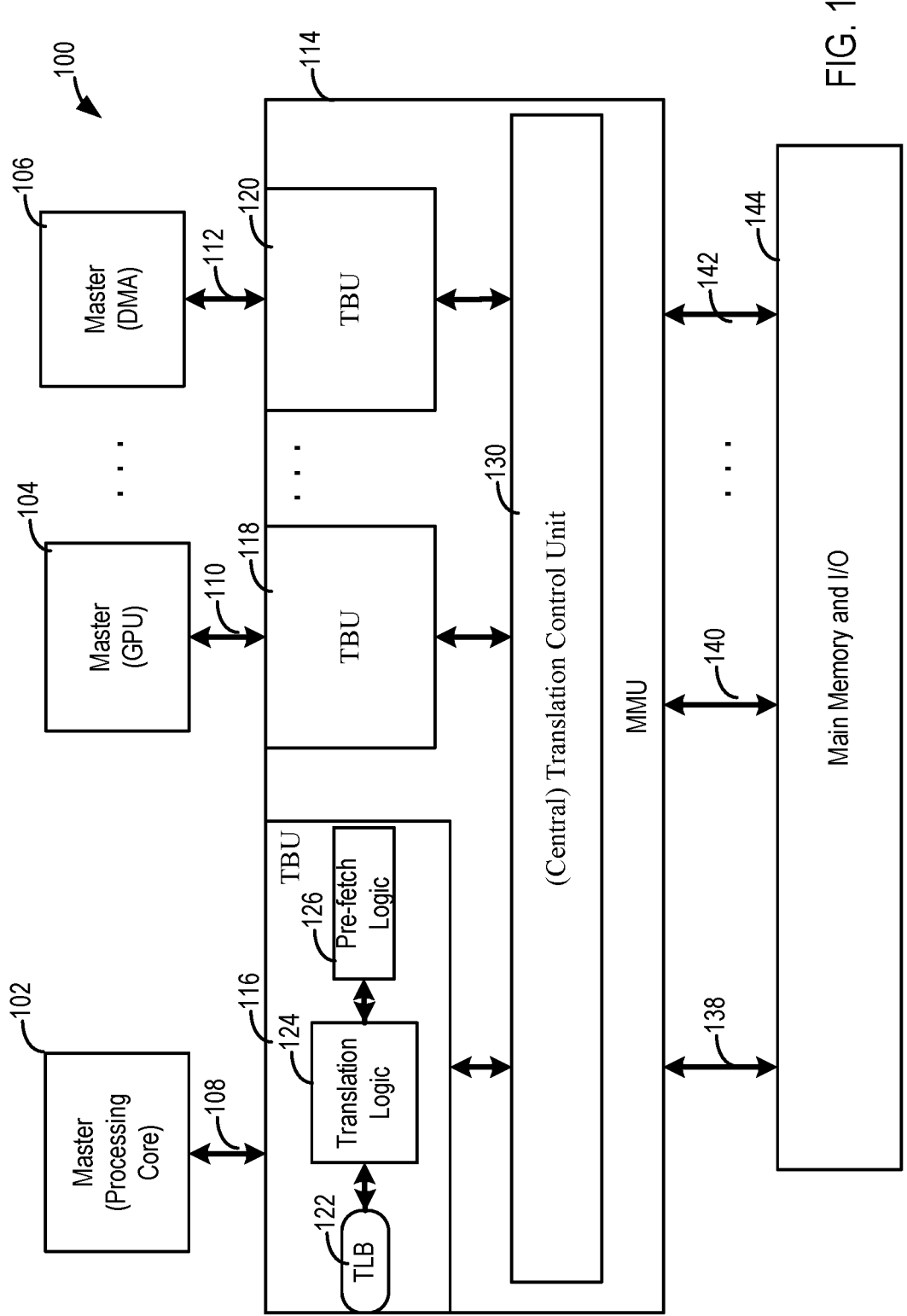
FIG. 1 depicts a block diagram of a system for generating address translation prefetch requests for a multiple port MMU, consistent with various implementations of the present disclosure.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Various implementations are directed toward improving virtual memory address translation through the use of prefetch operations to populate Translation Look-aside Buffers (TLBs). For instance, a memory management unit (MMU) includes a plurality of prefetch logic circuit that generate address translation prefetch requests. The plurality of prefetch logic circuits each corresponds to a respective port that is a source of the address translation prefetch requests. Each of the prefetch logic circuits is configured to generate prefetch requests that result in populating a respective TLB. In this manner, the different TLBs are populated relatively independently from one another and in a proactive manner.

The prefetch logic circuits are part of the MMU, which allows the MMU to generate and terminate the prefetch requests without direct control and oversight by external circuits. For instance, masters that are connected to ports of the MMU do not need to have knowledge of the prefetch request generation and processing to populate corresponding TLBs. Moreover, the MMU can reuse logic that also handles TLB misses. In particular, the prefetch requests can be handled in a similar manner as a TLB miss by performing a page walk in physical memory to find the physical address for a requested virtual address. The corresponding physical address can then be stored in the TLB. The prefetch request would then be terminated by the MMU, while a TLB miss would proceed by generating an access (read or write) request to the retrieved physical address.

Certain implementations include a plurality of prefetch logic circuits that provide customizable options for controlling how prefetch operations are generated and processed. The customizable options can allow for each prefetch logic circuit to be configured differently relative to their respective virtual memory spaces and virtual memory address generation circuit. For example, each prefetch logic circuit could be configured to issue prefetch requests that request data blocks from a virtual address range that corresponds to a page size of their respective virtual memory space. Each master or virtual memory address generation circuit (e.g., each central processing unit (CPU), graphics processing unit (GPU), or direct memory access (DMA) unit) might have a different page size. The use of separate prefetch logic circuits for respective ports, each with customizable options, can allow for different settings for each port. This may improve the efficiency of the prefetch operations. Various examples of customizable options are discussed in more detail herein.

Relative to a process running within an operating system, the virtual memory space can appear to be large, contiguous sections of memory, while the actual, physical location for the data can be dispersed across different areas of a physical memory circuit that provides the main memory. A processing circuit configured to provide virtual memory space can generate requests for access to data using virtual memory addresses without having to deal with the actual location of the data within main memory. An MMU circuit (or just "MMU" for brevity) can then handle the conversion to a physical address. The conversion can be carried out based upon mappings stored in a page table, with each addressable mapping being referred to as a page table entry.

According to various implementations, address translation between virtual and physical (main) memory spaces are performed by an MMU that accesses a page table that is stored in the main memory. This process is sometimes referred to as a page walk. The page walk can require multiple accesses to the page table, stored in physical/main memory, in order to compute the physical address. The obtained physical address is then used as part of yet another main memory access that retrieves the data corresponding to the original virtual memory access request. Thus, a virtual memory access can result in many accesses to the main memory, and therefore be many times slower than a single, direct access to main memory. To speed up the process, a local cache circuit can store frequent page translations so that the page walk (and corresponding main memory accesses) can be avoided. This type of cache circuit is sometimes referred to as a Translation Look-aside Buffer (TLB). The MMU can first check the TLB contents to find a match for a virtual memory access. If the cache contains a matching entry (a TLB "hit"), the appropriate physical address information is used to compute the physical address. The MMU can then issue a main memory access request using the physical address. If the cache does not contain a matching entry (a TLB "miss"), the MMU can access the page table to retrieve the desired physical address, resulting in the aforementioned page walk delays.

According to various implementations, an MMU can have multiple ports for multiple different sources of virtual memory access requests. These sources are referred to herein as either virtual memory address generation circuits or masters. Each port can have a different TLB and corresponding control circuitry. The TLB and control circuit are collectively referred to as a Translation Look-aside Buffer unit (TBU). A single Translation Control Unit (TCU) circuit can manage address translations for all of the TBUs. Various implementations are directed toward the generation and handling of virtual memory access request for the purpose of populating TLBs with entries in order to reduce TLB misses. These virtual memory access requests are not generated by a master and are instead generated by a prefetch logic circuit within a TBU of the MMU. The requests are referred to as prefetches because they are generated in anticipation of what virtual addresses a master might request in the future. More particular aspects allow for the prefetch logic circuits to be individually tailored for each port of the MMU.

Memory accesses in many systems are latency prone and unpredictable. Many applications like video or Direct Memory Access (DMA) can have both bandwidth and fixed latency requirements relating to large amounts of read/write data. Moving large amounts of data in a virtual system involves many MMU page translations to be performed, which can consume many clock cycles. MMU page table caching in TLBs can play a vital role in mitigating the translation overhead. Example page table sizes can vary between 4 KB, 16 KB or 64 KB. The page table translation occurs once for each page, with an offset being used to index within each page. Assuming that a system uses the 4 KB page size granularity, an MMU would be performing page table translation once for every new 4 KB of address space accessed. As stated earlier, page table walks can be prohibitively time consuming and can use limited memory resources.

Various implementations are directed toward a configurable prefetching approach that provides efficient data movement in memory systems of IC chips, which can be configured as SoCs or as other processing systems. MMUs in many SoCs have very limited prefetching capabilities, e.g., due to limitations on the available resources and the uncertainty in how the SoC will ultimately be used by the end users. Various implementations provide the flexibility to configure or program how prefetch operations are handled. Examples include configuring the number of prefetch requests needed to be performed, as well as mitigating the overhead for the prefetch requests by limiting the number of main memory accesses made in support of the prefetch requests.

Some implementations also take into consideration the efficiency of the memory system by implementing the prefetch generation within each of the TBUs of the MMU. Placing the control over the prefetch generation (logically) closer to the source of the virtual memory access requests can allow for more individualized control (e.g. on a port-by-port basis) relative to an approach in which prefetch requests are centrally generated (e.g., relative to prefetching generation at a TCU, which deals with transactions from multiple TBUs and associated ports).

Turning now to the figures, FIG. 1 depicts a block diagram of a system for generating address translation prefetch requests for a multiple port MMU, consistent with various implementations of the present disclosure. The depicted components of the system reside on an IC chip 100, which includes multiple masters 102, 104, and 106 that generate virtual memory access requests for a corresponding input port 108, 110, and 112, and a corresponding output port 138, 140, and 142. The masters include one or more of processing circuits, where each processing circuit provides one or more functions for the system. A few non-limiting examples of such circuits include CPUs or processing cores, GPUs, and circuits configured to operate using DMA.

A multiport MMU 114 is configured to receive virtual memory access requests from the masters on corresponding ports. The ports have different, corresponding TBUs 116, 118, and 120, where each TBU corresponds to a different virtual memory space of the associated master. TCU 130 controls and manages the TBUs and their respective TLB circuits, including implementing a page walk for main memory 144 when there is a TLB miss.

The TBUs 116, 118 and 120 include translation logic circuits 124 that are configured to handle virtual memory access requests. This includes checking the TLB to determining whether or not the physical memory address is cached. In response to a TLB hit, the TBUs can generate a physical memory access request. In response to a TLB miss, the TBUs can generate a TLB miss indication in the form of a page walk request that is sent to the TCU 130.

(TLB) prefetch logic circuits 126 are configured to generate address translation prefetch requests for their respective ports, thereby decoupling the prefetch generation of the ports from one another. In particular implementations, the TLB prefetch circuits are designed to allow the masters 102, 104, and 106 to adjust parameters that are used to determine when and how to generate the prefetch requests. For example, one or more sets of configuration registers can be provided in order to customize each of the circuits. The configuration registers can be accessed by the depicted masters 102, 104, and 106, or by another master that has sufficient privileges. The contents of the configuration registers are accessible by TLB prefetch circuits, which are configured according to the values stored within the registers. In some implementations, the masters directly access the TLB prefetch circuits in order to send data specifying the configuration settings. The direct access might be accomplished using a separate bus and interface, relative to the memory bus and ports used by the masters.

The TLB prefetch circuits may be implemented in programmable logic and the end user can set one or more of the parameters in the design files. The manner in which the parameters can be set and adjusted is not limited to these examples, and various combinations of different solutions can be used. The decoupling and configurability can each be particularly useful for populating the TBUs in a manner that is tailored toward the different characteristics of each of respective masters. Examples of these characteristics include the configuration of the virtual memory space (e.g., page size), and the expected memory access profile (e.g., the frequency and size of data accesses).

According to some implementations, MMU 114 can be configured to handle prefetch requests differently from page walk request. In particular, the MMU 114 can be configured to prevent physical access requests from being generated for the prefetch requests. For example, prefetch circuit 126 may generate a prefetch request for a virtual memory address X. The TCU 130 performs a page walk by accessing the page table stored in main memory 144. Once the TCU 130 completes the page walk, the TLB 122 in TBU 116 is updated by storing a translation entry corresponding to the virtual memory address X and the corresponding physical memory address Y. The MMU 114 identifies the transaction as a prefetch and does not send a physical memory access request for physical address Y.

Figure 2:
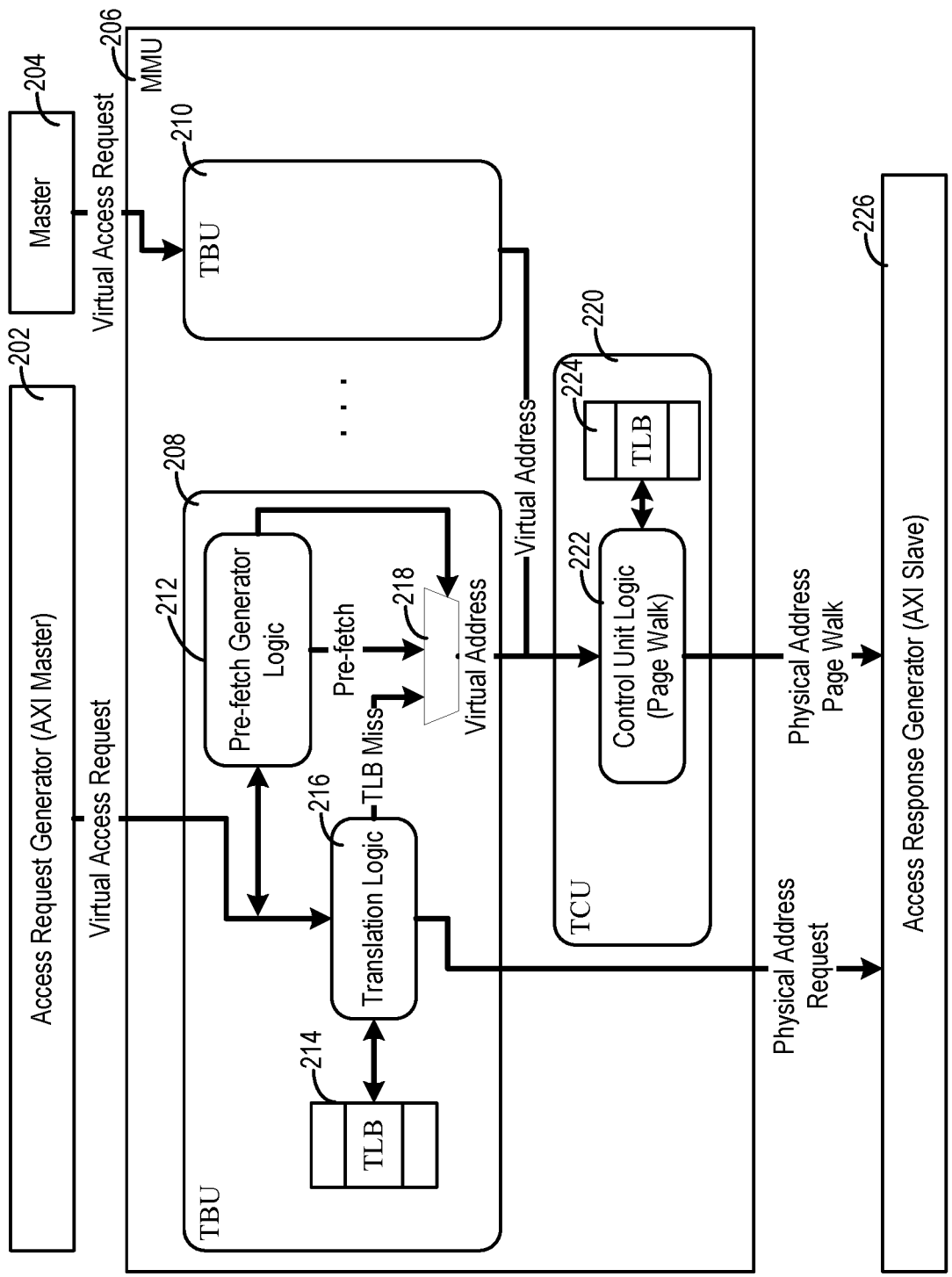
FIG. 2 is a block diagram that shows particular aspects of an MMU, consistent with implementations of the present disclosure.

FIG. 2 is a block diagram that shows particular aspects of an MMU, consistent with implementations of the present disclosure. FIG. 2 shows an MMU 206 with multiple TBUs 208 and 210. Although not limited thereto, the description of the various components of FIG. 2 is generally consistent with similar components discussed in FIG. 1 and elsewhere in the present disclosure. An access request generator 202 operates in a virtual memory space that is mapped to a physical memory space provided by the access response generator 226. In certain embodiments, the system of FIG. 2 is part of an SoC that uses a master-slave interconnection solution, such as AMBA (Advanced Microcontroller Bus Architecture) eXtensible Interface (AXI) interconnection/bus. Other interconnection and bus solutions are also possible.

According to particular implementations, the TBU 208 includes TLB prefetch generator logic circuit 212 that is configured to monitor virtual memory access requests received on a corresponding port of the MMU 206. For instance, the TLB prefetch logic circuit 212 can be connected to the address request bus used by the access request generator 202. The TLB prefetch logic circuit 212 identifies and tracks the addresses for the virtual memory access requests appearing on the address request bus. The TLB prefetch logic circuit 212 can then determine whether or not a trigger condition has been satisfied. In particular implementations, the trigger condition(s) for the TLB prefetch logic circuit 212 is set based upon one or more configurable parameters. For example, the TLB prefetch logic circuit 212 may be configured with a trigger condition that compares the virtual memory address to the current contents of the TLB. A particular trigger condition could be based upon whether or not the corresponding TLB contains entries sufficient to cover a set number of future sequential virtual memory address relative to the current virtual memory address. For example, the current virtual memory address may be X and the trigger condition could be three subsequent address requests. The TLB prefetch logic circuit 212 determines whether the TLB contains entries for X+1, X+2, and X+3. If not, the trigger condition is satisfied and one or more prefetch requests can be generated for the missing entries. The prefetch translation generator logic 212 transmits the generated prefetch requests to the TCU 220.

Translation logic circuit 216 can be configured to receive virtual memory access requests from the access request generator 202 and determine whether the requests are TLB hits or misses based upon the contents of the TLB 214. In the case of a TLB hit, the translation logic 216 can generate a physical address request that is sent to an access response generator 226, which can be one of several slave devices mapped to the physical memory space.

Multiplexer circuit 218 controls whether the TCU 220 receives virtual memory access requests from the translation logic 216 or the TLB prefetch logic circuit 212. This can be particularly useful for simplifying the control unit logic 222. For example, the control unit logic 222 can operate without direct knowledge of whether a received virtual address is a regular access request or a prefetch, and without arbitrating between additional sources of virtual addresses.

TCU 220 can respond to a received virtual address by performing a page walk to retrieve the corresponding physical address from the main memory. Upon finding the appropriate physical address, TCU 220 can provide the physical address to the requesting TBU for storage in the corresponding TLB. In some embodiments, TCU 220 can also include a TLB 224, which is thereby shared between the multiple TBUs.

Consistent with various embodiments of the present disclosure, when a TBU receives a physical address from the TCU 220, the TBU determines whether the physical address corresponds to a regular memory access request (from a master 202, 204) or to a prefetch request (from TLB prefetch logic circuit 212). If the TBU determines that the physical address is for a regular memory access request, the TLB 214 can be updated and the translation logic 216 can generate a physical memory access to complete the access request. If the TBU determines that the physical address is for a prefetch request, the TBU can update the TLB 214 without also generating of a corresponding physical memory access.

Particular implementations use an identifier (ID) within the physical access request in order to identify a physical access request that should be filtered. For example, process-unique IDs can accompany virtual memory (prefetch) access requests and the corresponding physical memory access requests. The TLB prefetch logic circuit 212 can be assigned a particular ID that is recognized by the translation logic 216 so that translation logic 216 does not generate physical access requests for prefetch requests.

As an example of a trigger condition, the TLB prefetch logic circuit 212 can be configured to delay transmission of prefetch requests until the (AXI) interconnection/bus has been detected to enter an idle state. Limiting the prefetch requests to idle states/times may be useful for mitigating the adverse effect of the additional memory accesses from the prefetch requests. In certain embodiments, the responsiveness to the idle state can be disabled to allow the prefetch requests to be transmitted without regard to the idle state of the bus.

Consistent with various embodiments, the masters 202 and 204 can send requests directly to the TBUs 208 and 210 that specify a specific set of prefetch requests for a set of the virtual memory addresses. The virtual memory addresses can be provided directly to the TBU and prefetch generator logic by, for example, by writing to configuration registers or using a separate communication bus. The TBU can respond by generating a corresponding set of prefetches that are then sent to the TCU. For example, a master might generate memory accesses that are not sequential. The TLB prefetch logic circuit 212 might not prefetch the non-sequential addresses if it has no knowledge of the access pattern of the master. The master can therefore directly control the prefetches so that the TLB is populated before the corresponding access requests are generated.

Figure 3:
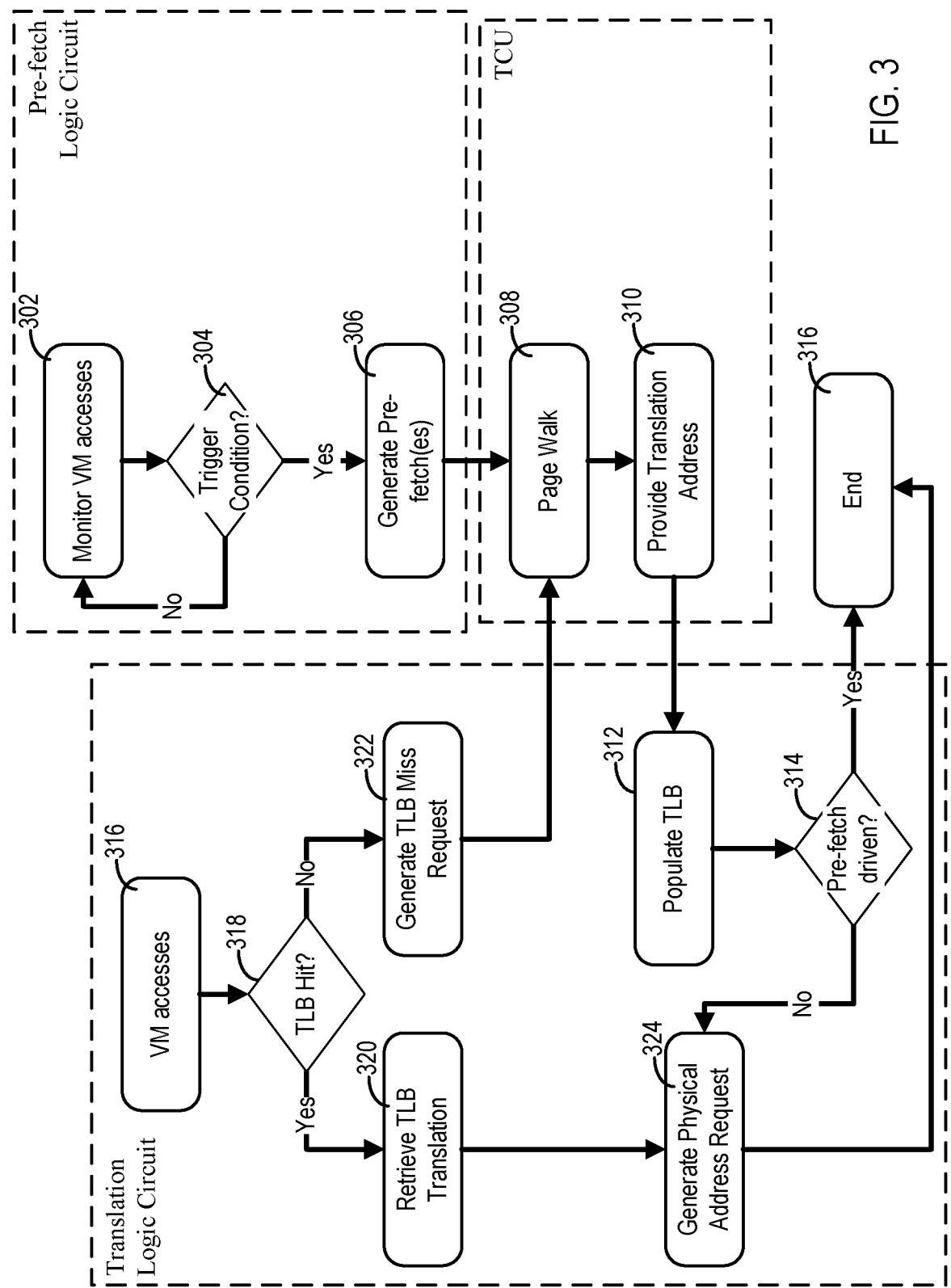
FIG. 3 is a flow diagram for generating address translation prefetch requests, consistent with implementations of the present disclosure.

FIG. 3 is a flow diagram for generating address translation prefetch requests, consistent with implementations of the present disclosure. A translation logic circuit receives virtual memory (VM) access requests on a corresponding port of an MMU, per block 316. A TLB prefetch circuit monitors the VM access requests, per block 302. For example, the TLB prefetch circuit can be connected to the address bus between a master and an MMU. As part of the monitoring effort, the TLB prefetch circuit thereby has access to the virtual memory address values for the virtual memory accesses.

The translation logic circuit then checks (snoops) the TLB contents to determine whether or not the translation information is cached for the received VM access requests, per block 318. If there is a TLB hit, the translation logic circuit retrieves the TLB translation data from the TLB and uses the data to generate a physical memory address requests, per blocks 320 and 324, respectively. The memory transaction can then complete when the corresponding slave device responds to the access request, per block 316.

If there is a TLB miss, the translation logic circuit can generate a TLB miss request that is then provided to the TCU, per block 322. The TCU can initiate a page walk to retrieve the physical memory address that corresponds to the VM access request, per block 308. The results of the page walk are then provided to the translation logic circuit, per block 310. The translation logic circuit uses the results to populate the TLB, per block 312. In some embodiments, the TCU can have a separate TLB that can also be populated using the results of the page walk. The translation logic circuit can then determine whether the page walk was driven by a prefetch or normal access request, per block 314. For example, the translation logic circuit can be designed to incorporate an indication of whether or not a particular transaction is a prefetch request. The flags can then be used to differentiate prefetches generated by the translation logic circuit from VM accesses that originated from a master. A particular example of such a flag is a process/task identifier (ID) that uniquely identifies the TLB prefetch circuit, relative to process IDs used by the master. The translation logic circuit then checks the page walk results to see whether they contain the unique ID that corresponds to TLB prefetches. If the access request is not prefetch driven, the translation logic circuit can generate a physical address request so that the VM access request from the master can be completed, per block 324. If the access request is prefetch driven, the translation logic circuit filter can end the processing of the request, per block 316.

According to various implementations, the TLB prefetch logic circuit uses the monitored information to determine when a trigger condition has been met, per block 304. If the trigger condition is not met, the TLB prefetch logic circuit continues to monitor the virtual memory accesses. If the trigger condition is met, the TLB prefetch circuit generates one or more address translation prefetch requests, per block 306. The address translation prefetch requests can then be sent to the TCU, which will perform a page walk to find the corresponding physical memory addresses. In certain implementations, the transmission of the VM access requests to the TCU includes the use of a multiplexer circuit that allows the TLB logic prefetch circuit to control whether the TCU receives access requests from the translation logic circuit or the prefetch logic circuit.

In some instances, multiple trigger conditions may be checked before the TLB prefetch logic circuit begins generating prefetch requests. For example, the TLB prefetch logic circuit can be configured with a first trigger event that corresponds to a depth of prefetch requests in the TLB (relative to an address for a current virtual memory request). A second trigger event might correspond to idle status of the data bus between a master and the MMU. Once both trigger events are satisfied, the TLB prefetch circuit begins generating prefetch(es). Various examples of trigger conditions are discussed in more detail herein.

Figure 4:
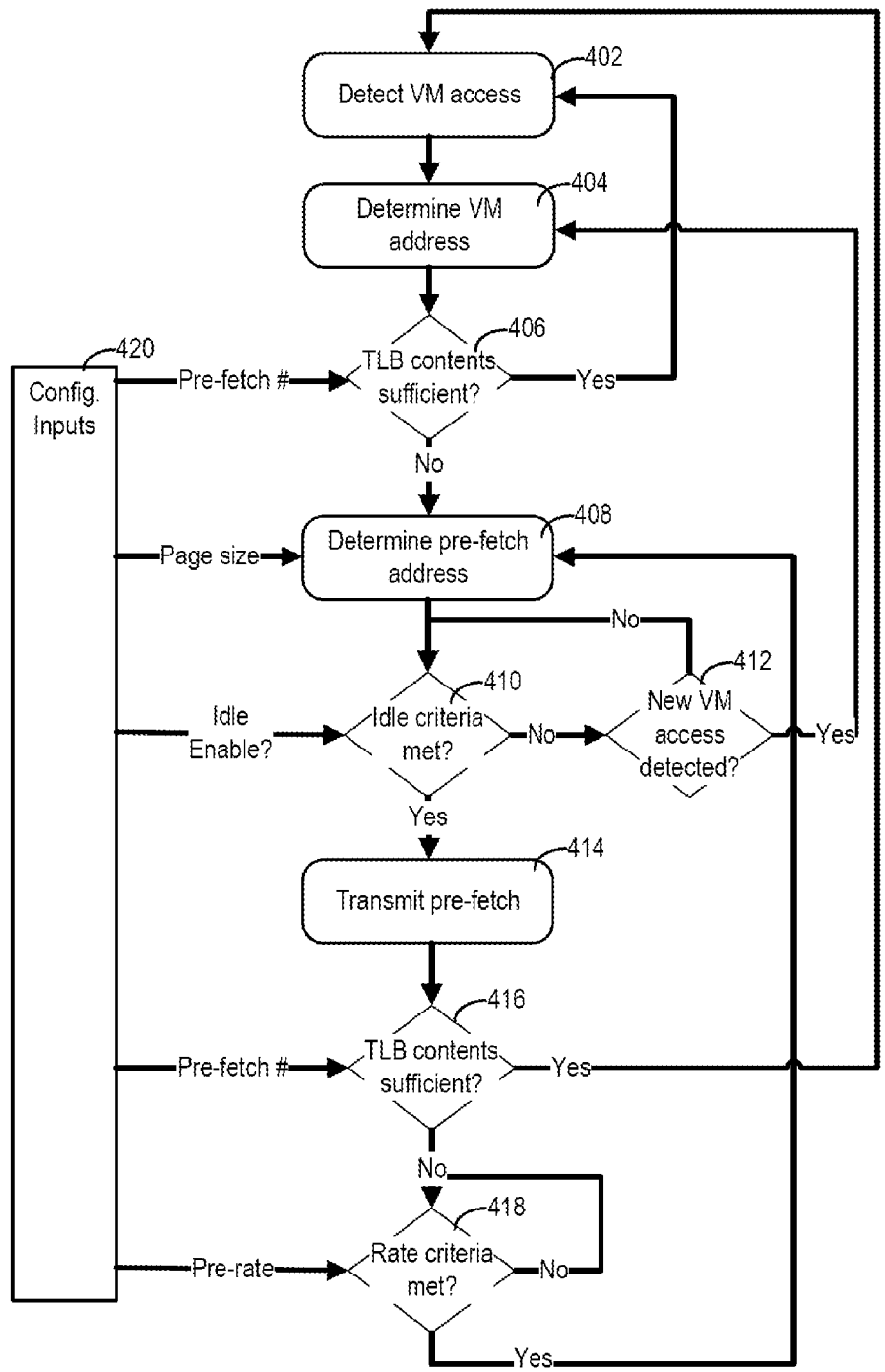
FIG. 4 is a flow diagram for configuring and using trigger conditions, consistent with implementations of the present disclosure.

FIG. 4 is a flow diagram for configuring and using trigger conditions, consistent with implementations of the present disclosure. The flow shows that various configuration inputs 420 can be used to set different trigger conditions and functionality of the TLB prefetch circuit. The flow begins when the TLB prefetch logic circuit detects a virtual memory access request, per block 402. The TLB prefetch logic circuit also determines the VM address for the virtual memory access request, per block 404. The TLB prefetch circuit can use the determined virtual memory address to decide whether or not the current contents of the TLB are sufficient, per block 406. According to certain implementations, the determination of block 406 can be based upon a prefetch number or depth. For instance, a prefetch depth of three would indicate that the TLB should contain three subsequent entries, relative to the determined virtual memory address. More particularly, if the determined virtual memory address is 'X,' the TLB prefetch circuit determines whether or not the TLB includes entries for X+1, X+2, and X+3, where X+1 represents the next sequential page in the virtual memory space from X.

If the contents are determined to be sufficient, the TLB prefetch circuit continues to monitor and detect virtual memory accesses, per block 402. If the contents are not sufficient, the TLB prefetch circuit determines the address translation prefetch address, per block 408. For instance, in the prior example of memory address 'X' and a depth of three, the TLB prefetch circuit generates an address for the lowest of X+1, X+2, and X+3. More particularly, the TLB might contain an entry for X+1, but not for X+2 or X+3. The TLB prefetch circuit therefore generates a prefetch address corresponding to X+2.

According to certain implementations, the TLB prefetch circuit can be configured to account for different virtual memory page sizes. The page size can determine the address size for each entry, because low-order bits of a virtual address do not affect the virtual-to-physical translation; the low-order bits are used as an offset within the desired page. The number of bits used for the offset is determined by the page size of the virtual memory space. For example, 4 KB pages have the 12 bits that are used for an offset. Non-limiting examples of page size settings are 4 KB, 16 KB, or 64 KB. Accordingly, the TLB prefetch circuit can use the page size configuration input 420 to determine the proper prefetch address, per block 408.

In some implementations, the TLB prefetch circuit can be configured to wait for the address bus to go idle before transmitting prefetch requests. Accordingly, the TLB prefetch circuit are configured to determine whether or not idle criteria (trigger conditions) are met, per block 410. The first consideration can be whether or not the idle determination is enabled. If not enabled, the TLB prefetch circuit transmits the address translation prefetch request without regard for the idle status of the bus, per block 414. If the idle determination is enabled, the TLB prefetch circuit determines whether or not the bus is idle. If the bus is idle, the TLB prefetch circuit transmits the address translation prefetch request, per block 414. If the bus is not idle, the TLB prefetch circuit continues to wait for the bus to become idle. While waiting, a new virtual memory access could be received. Accordingly, the TLB prefetch circuit is configured to identify this occurrence, per block 412. Upon detection of a new access request, the TLB prefetch circuit repeats the flow beginning at block 404.

After the TLB prefetch circuit transmits the address translation prefetch request, the TLB prefetch circuit determines whether or not the resulting contents of the TLB are sufficient per block 416. As discussed herein, the particular depth can be a configurable amount. For example, in the above example with a depth of three, the TLB prefetch circuit determines whether or not the TLB contains X+1, X+2 and X+3. If the depth was four, the TLB prefetch circuit determines whether or not the TLB contains X+1, X+2, X+3, and X+4. If the TLB contents are sufficient, the TLB prefetch circuit does not generate additional prefetch requests until additional virtual memory accesses are detected, per block 402. If the TLB contents are not sufficient, then the TLB prefetch circuit can generate additional prefetch requests.

In certain implementations, the TLB prefetch circuit is configurable to limit the rate at which prefetch requests can be issued, per block 418. For example, the issue rate can be expressed as a total number of prefetch requests that can be outstanding at any given time. The length of time that is required to complete a page walk can often be sufficient to generate and transmit multiple prefetch requests. Each additional prefetch request can consume more resources from the memory system. At the same time, the master may begin issuing additional virtual memory access requests while prefetch requests are still pending, and the additional requests may be delayed by outstanding prefetch requests. Limiting the total number of prefetch requests that can be pending at any given time may help to limit the amount of delay that can be introduced by the use of prefetch requests.

In some implementations, the TLB prefetch circuit is configured to limit prefetch requests to every 'N' available address bus cycle, where one bus cycle corresponds to the timing between subsequent address requests issued on the address bus. Thus, for a value of four, the rate criteria will be met after four bus cycles have completed. The resulting delay can be useful for limiting the potential overhead caused by the issuance of the prefetch requests.

According to various implementations discussed herein, the TLB prefetch circuit is configured to use knowledge of the contents in the corresponding TLB, which is located in the MMU. Accordingly, the TLB prefetch circuit maintains a local copy of the TLB contents. The local copy does not need to include all of the TLB data or functionality. In particular, it can be sufficient for the local copy to include the virtual memory addresses for the current entries in the actual TLB (e.g., physical addresses do not need to be stored).

Various implementations are discussed in the context of the TLB prefetch circuit generating the address translation prefetch requests using sequential pages and corresponding addresses, the sequential addresses being relative to the address of the most recently received virtual memory access. Other implementations allow the TLB prefetch circuit to be configured to use non-sequential address generation algorithms to generate the prefetch addresses. For instance, a particular master may perform a function that often accesses memory for every other virtual page. The use of a corresponding TLB prefetch circuit allows the master to directly specify which addresses are prefetched, allowing the master to request prefetch addresses for ever other virtual page. A similar adjustment can be made relative to determining the sufficiency of the TLB contents relative to a desired depth parameter. Other, more complex, address generation algorithms can also be used depending upon the complexity of the master.

Figure 5:
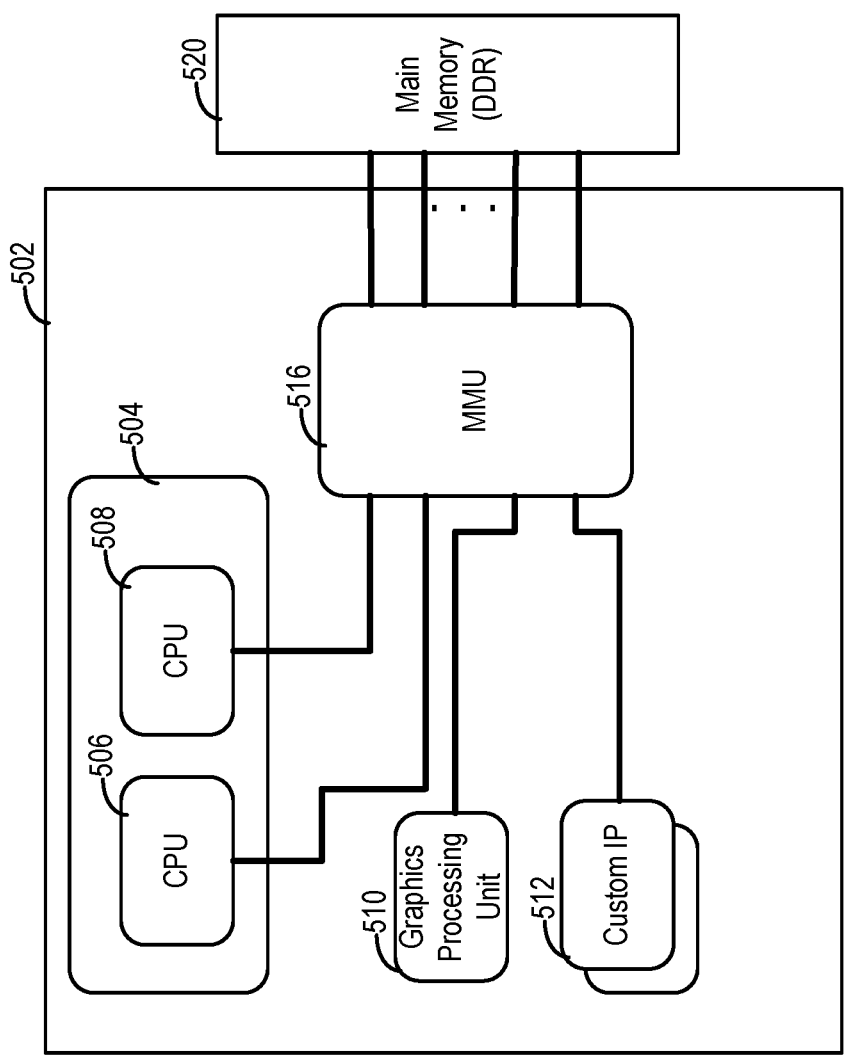
FIG. 5 shows an example of an integrated circuit (IC) chip that is configured to use address translation prefetch requests, consistent with implementations of the present disclosure.

FIG. 5 shows an example of an integrated circuit (IC) chip that is configured to use address translation prefetch requests, consistent with implementations of the present disclosure. The IC chip 502 includes multiple sources of virtual memory access requests (also referred to as masters in some interconnection solutions). The depicted examples include a microcontroller circuit 504 with one or more CPUs 506 and 508, a GPU 510, and customizable intellectual property (IP) cores 512. A few other non-limiting examples of access request sources include DSPs and DMA circuits that might be linked to input/output circuits, IP cores, or other circuits.

Although the various implementations discussed herein are not necessarily limited thereto, the IC chip can be a programmable IC chip. For example, the programmable IC could be an SoC that includes programmable resources (e.g., logic blocks and interconnects). The programmable resources could be a field programmable gate array logic (FPGA) that includes several different types of programmable logic blocks in the array. Though a programmable IC is described, those skilled in the art will recognize that the disclosed methods and systems may be applied to circuit designs that target application specific integrated circuits (ASICs) and are not limited to programmable integrated circuits (ICs).

The depicted IC chip includes a MMU 516, which can be consistent with one or more of the implementations discussed herein. The MMU controls access to main memory 520, which is depicted as being off-chip. The main memory 520 can also be located on chip.

One or more of the depicted components can be implemented in programmable logic. The use of programmable logic can allow for more flexibility to the end user. For example, the prefetch translation logic circuits can be provided as part of a library of IP cores developed by the IC chip manufacturer. An end user can then decide whether to implement the IP cores for these circuits. Thus, the IP cores can be selectively added or removed from a design.

A programmable IC 502 can include a large number of different programmable tiles, which are not expressly depicted for sake of simplicity. A few examples of programmable tiles include multi-gigabit transceivers (MGTs), configurable logic blocks (CLBs), random access memory blocks (BRAMs), input/output blocks (IOBs), configuration and clocking logic (CONFIG/CLOCKS), digital signal processing blocks (DSPs), specialized input/output blocks (I/O), for example, clock ports, and other programmable logic such as digital clock managers, analog-to-digital converters, system monitoring logic, and so forth. FIG. 5 is intended to illustrate a non-limiting example of a (programmable) IC chip architecture.

For the various flow diagrams depicted herein, the particular orders of the blocks and associated functions are provided as examples. The ordering is not necessarily limiting and can be varied according to various implementations.

Those skilled in the art will appreciate that various alternative computing arrangements, including one or more processors and a memory arrangement configured with program code, would be suitable for hosting the processes and data structures that may carry out functions disclosed herein. In addition, the processes may be provided via a variety of computer-readable storage media or delivery channels such as magnetic or optical disks or tapes, electronic storage devices, or as application services over a network.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems that use RAM circuits. Other aspects and features will be apparent to those skilled in the art from consideration of the specification. The portions of the methods and system may be implemented as one or more processors configured to execute software, as an application specific integrated circuit (ASIC), or as a logic on a programmable logic device. Moreover, the various circuits identified herein may share hardware circuitry, such as use of a common computer processing unit or digital processing unit. It is intended that the specification and drawings be considered as examples only, with a true scope of the invention being indicated by the following claims.

What is claimed is:

1. A system comprising:
   a memory management unit (MMU) circuit that includes:
      a plurality of ports;
      a plurality of translation buffer units (TBU), each TBU corresponding to a respective port of the plurality of ports and including:
         a translation lookaside buffer (TLB) circuit;
         a translation logic circuit configured to perform virtual to physical address translation using the TLB circuit;
         a TLB prefetch logic circuit that, for a corresponding port of the plurality of ports, is configured to:
            monitor virtual memory access requests received at the corresponding port of the MMU circuit;
            detect, for the virtual memory access requests, satisfaction of at least one trigger condition;
            generate, in response to the satisfaction of the at least one trigger condition, address translation prefetch requests;
            receive an indication of a page size for virtual memory of the system and to adjust the at least one trigger condition in response to the indication; and
      a control circuit configured to
         transmit the address translation prefetch requests to a physical memory circuit; and
         receive, in response to the address translation prefetch requests, address translation data for populating the TLB circuit.

2. The system of claim 1, wherein each TBU is configured to send, in response to determining that virtual memory access requests received on the respective port is a TLB miss, a TLB miss indication to the control circuit.

3. The system of claim 2, wherein each translation logic circuit is configured to send, in response to determining that virtual memory access requests received on the respective port is a TLB hit, a physical memory address request to a physical address indicated by the TLB circuit.

4. The system of claim 2, wherein each TBU includes a multiplexer circuit configured to select between requests from the translation logic circuit and the TLB prefetch logic circuit.

5. The system of claim 1, wherein each TLB prefetch logic circuit is further configured to receive an indication of a number of address translation prefetch requests to generate and to adjust another trigger condition in response to the indication.

6. The system of claim 1, wherein each TLB prefetch logic circuit is further configured to detect an idle state of a bus connected to the corresponding port and to generate the address translation prefetch requests in response to detecting of the idle state.

7. The system of claim 6, wherein each TLB prefetch logic circuit is further configured to disable, in response to receiving a corresponding indication, the responsiveness to detecting of the idle state.

8. The system of claim 1, wherein each TLB prefetch logic circuit is further configured to receive an indication of an issue rate for generating address translation prefetch requests and to insert, in response to the indication, a delay between transmitting the address translation prefetch requests.

9. The system of claim 1, further comprising an integrated circuit chip that includes the MMU circuit and at least one master connected to a port of the plurality of ports.

10. A method for generating address translation prefetch requests for a virtual memory and a memory management unit (MMU) circuit having a plurality of ports, the method comprising:
  performing virtual to physical address translations using translation logic circuits, each translation logic circuit including a translation lookaside buffer (TLB) and corresponding to a respective port of the plurality of ports;
  monitoring, using the prefetch logic circuits corresponding to a respective port of the plurality of ports, virtual memory access requests received at ports of the MMU circuit;
  detecting, for the virtual memory access requests, satisfaction of at least one trigger condition;
  generating, in response to the satisfaction of the at least one trigger condition, address translation prefetch requests;
  receiving an indication of a page size for the virtual memory and adjusting the at least one trigger condition in response to the indication;
  converting the address translation prefetch to physical address requests for a page walk of a page table stored in a physical memory circuit; and
  receiving, in response to the address translation prefetch requests, address translation data for populating a TLB.

11. The method of claim 10, further comprising determining, using the translation logic circuits, that virtual memory access requests received on the respective port are TLB misses, and sending, in response, TLB miss indications to a control circuit of the MMU.

12. The method of claim 10, further comprising loading the address translation data into the TLB.

13. The method of claim 10, further comprising receiving an indication of a number of address translation prefetch requests to generate and adjusting another trigger condition in response to the indication.

14. The method of claim 10, further comprising detecting an idle state of a bus connected to a port of the MMU circuit and wherein the generating address translation prefetch requests is in response to the detecting of the idle state.

15. The method of claim 14, further comprising disabling, in response to receiving a corresponding indication, the responsiveness to the detecting of the idle state.

16. The method of claim 10, further comprising receiving an indication of an issue rate for generating address translation prefetch requests and inserting, in response to the indication, a delay between the address translation prefetch requests.

17. The method of claim 10, wherein the address translation prefetch requests are each read requests.

18. The method of claim 10, wherein the address translation prefetch requests include write requests.

* * * * *